(12) United States Patent
Rhee

(10) Patent No.: US 8,023,761 B2
(45) Date of Patent: *Sep. 20, 2011

(54) APPARATUS FOR REMOVING NOISE OF VIDEO SIGNAL

(75) Inventor: Kwang Yeon Rhee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,099

(22) Filed: Aug. 9, 2010

(65) Prior Publication Data

US 2011/0037899 A1   Feb. 17, 2011

Related U.S. Application Data

(63) Continuation of application No. 11/332,396, filed on Jan. 17, 2006, now Pat. No. 7,792,381.

(30) Foreign Application Priority Data

Jan. 18, 2005   (KR) .................. 10-2005-0004498
Sep. 29, 2005   (KR) .................. 10-2005-0091446

(51) Int. Cl.
G06K 9/40   (2006.01)
H04N 5/00   (2011.01)

(52) U.S. Cl. ......... 382/260; 382/264; 348/606; 348/607

(58) Field of Classification Search .......... 348/606, 348/607, 618, 627, 683, 701; 382/260–265
See application file for complete search history.

(56) References Cited

U.S. PATENT DOCUMENTS 5,799,111 A       8/1998   Guissin
6,067,125 A *    5/2000   May .......................... 348/607
6,289,110 B1     9/2001   Kim et al.
6,996,184 B2     2/2006   Hamamatsu et al.
7,538,822 B2 *   5/2009   Lee et al. .................. 348/606
7,792,381 B2 *   9/2010   Rhee ......................... 382/260

(Continued)

FOREIGN PATENT DOCUMENTS

CN   1123987 A   6/1996

(Continued)

OTHER PUBLICATIONS

Welch G. et al.; "An Introduction to the Kalman filter", Computer Graphics. Siggraph 2001, Conference Proceedings. Los Angeles, CA, Aug. 12-17, 2001, pp. 7-47.

(Continued)

*Primary Examiner* — Phuoc Tran
*Assistant Examiner* — Alex Liew
(74) *Attorney, Agent, or Firm* — Birch, Stewart, Kolasch & Birch, LLP

(57) ABSTRACT

An apparatus for removing a noise of a video signal is disclosed, by which a noise level can be effectively estimated to enhance an image quality of the video signal, by which the noise can be removed in a manner of effectively estimating a noise level though motion adaptive filtering, and by which blurring is prevented in the process of removing the noises. The present invention includes a temporal noise level estimation unit estimating a level of a temporal noise included in the video signal using a difference between two temporally consecutive videos, a noise correction unit correcting a noise estimated by the temporal noise level estimation unit, and a noise removal unit removing the noise included in the video signal using a level of the corrected noise.

3 Claims, 9 Drawing Sheets

U.S. PATENT DOCUMENTS

| | | | |
|---|---|---|---|
| 2005/0105627 A1* | 5/2005 | Sun et al. | 375/240.29 |
| 2005/0271298 A1* | 12/2005 | Yu | 382/286 |

FOREIGN PATENT DOCUMENTS

| | | |
|---|---|---|
| EP | 0455434 A2 | 11/1991 |
| EP | 0950899 | 10/1999 |
| EP | 1028390 A3 | 8/2000 |
| KR | 10-2001-0078286 A | 8/2001 |
| KR | 10-2004-0049429 A | 6/2004 |
| KR | 10-2005-0106548 A | 10/2005 |
| KR | 10-2006-0083619 A | 7/2006 |
| WO | WO-01/35636 A1 | 5/2001 |
| WO | WO-01/35677 A1 | 5/2001 |

OTHER PUBLICATIONS

Goldstein S. et al. "Outlier Rejection in Deformable Model Tracking", Proceedings of the IEEE Computer Science Conference on Computer Cision and Pattern Recognition Workshop, p. 1-6, 2004, XP010761962.

* cited by examiner

APPARATUS FOR REMOVING NOISE OF VIDEO SIGNAL

This application is a continuation application of application Ser. No. 11/332,396, filed on Jan. 17, 2006 now U.S. Pat. No. 7,792,381, which claims the benefit of the Korean Patent Application No. 10-2005-0004498, filed on Jan. 18, 2005 and the Korean Patent Application No. 10-2005-0091446, filed on Sep. 29, 2005, which are hereby incorporated by reference as if fully set forth herein.

BACKGROUND OF THE INVENTION

1. Field of the Invention

The present invention relates to a broadcast receiver, and more particularly, to an apparatus for removing a noise of a video signal. Although the present invention is suitable for a wide scope of applications, it is particularly suitable for noise reduction of the video signal.

2. Discussion of the Related Art

Generally, there always exist various noises such as a thermal noise of a camera, a noise in a transmission process and the like in a TV video signal. And, theses noises are the major factors of image quality degradation.

Hence, a TV receiving unit or the like carries out such a processing as a noise removal and the like. In doing so, if a level of a noise appended to a video is unknown, the processing cannot provide a correct result.

For instance, if a strong noise removal is carried out on a video having a very small noise, a detailed video component is removed to provide an unclear video, i.e., a blurred video.

On the other hand, if a weak noise removal processing is carried out on a video having a big noise, it is unable to sufficiently remove the noise appended to the video.

Hence, a noise reduction is a technique that is essential to high video quality.

A noise of a video signal is generally expressed as Formula 1.

$$g(x,y) = f(x,y) + n(x,y) \quad \text{[Formula 1]}$$

In Formula 1, if a signal $g(x, y)$ is measured by adding a noise signal $n(x, y)$ to an original video signal $f(x, y)$, it is assumed that the noise signal has a normalized distribution having $\sigma_n^2$ with an average 0 like $N(0, \sigma_n^2)$.

In this case, a noise reduction is carried out by filtering in a manner of estimating the original video signal $f(x, y)$ containing no noise from the measured video signal $g(x, y)$.

For this, such a method as spatial filtering, temporal filtering, spatio-temporal filtering and the like is used. Theses methods are effective in reducing noises by computing to output an average, intermediate value, weight total and the like between a target pixel to be filtered and neighbor pixels in the vicinity of the target pixel.

However, by theses methods, a fine component of a video is blurred. In particular, in case that a video motion varies a lot according to a time, blurring turns into afterimage in the temporal or spatio-temporal filtering. Hence, the corresponding image quality is degraded.

SUMMARY OF THE INVENTION

Accordingly, the present invention is directed to an apparatus for removing a noise of a video signal that substantially obviates one or more problems due to limitations and disadvantages of the related art.

An object of the present invention is to provide an apparatus for removing a noise of a video signal, by which a noise level can be effectively estimated to enhance an image quality of the video signal.

Another object of the present invention is to provide an apparatus for removing a noise of a video signal, by which the noise can be removed in a manner of effectively estimating a noise level though motion adaptive filtering.

Another object of the present invention is to provide an apparatus for removing a noise of a video signal, by which blurring is prevented in the process of removing the noises.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for removing a noise of a video signal according to the present invention includes a temporal noise level estimation unit estimating a level of a temporal noise included in the video signal using a difference between two temporally consecutive videos, a noise correction unit correcting a noise estimated by the temporal noise level estimation unit, and a noise removal unit removing the noise included in the video signal using a level of the corrected noise.

Preferably, the temporal noise level estimation unit includes an operation unit outputting an absolute value of a frame difference between the two temporally consecutive videos and a variance calculation unit calculating a variance of the absolute value as the level of the temporal noise.

Preferably, the temporal noise level estimation unit includes an outliner rejection unit clipping a difference between two temporally consecutive video signals at a same position into a prescribed threshold to output if the difference between the two temporally consecutive video signals is greater than the prescribed threshold and a variance calculation unit calculating a variance for a difference value outputted from the outlier rejection unit to output as the level of the temporal noise.

Preferably, the noise correction unit includes an infinite impulse response (IIR) filter having a plurality of taps receiving two temporally consecutive video signals.

In another aspect of the present invention, an apparatus for removing a noise of a video signal includes a spatial noise level estimation unit estimating a level of a spatial noise included in the video signal using a characteristic of a distribution of the noise and a distribution of the video signal, a temporal noise level estimation unit estimating a level of a temporal noise included in the video signal using a frame difference between two temporally consecutive videos, a global motion detection unit selecting to output one of the levels of the noises estimated by the spatial and temporal noise level estimation units, respectively according to a motion degree between the two temporally consecutive videos, a noise correction unit receiving to correct the level of the noise selectively outputted according to a control of the global motion detection unit, and a noise removal unit removing the noise included in the video signal using the corrected level of the noise.

Preferably, the temporal noise level estimation unit includes an operation unit outputting an absolute value of a frame difference between the two temporally consecutive videos and a variance calculation unit calculating a variance of the absolute value as the level of the temporal noise.

Preferably, the temporal noise level estimation unit includes an outliner rejection unit clipping a difference between two temporally consecutive video signals at a same position into a prescribed threshold to output if the difference between the two temporally consecutive video signals is greater than the prescribed threshold and a variance calculation unit calculating a variance for a difference value outputted from the outlier rejection unit to output as the level of the temporal noise.

In another aspect of the present invention, an apparatus for removing a noise of a video signal includes a spatial filtering unit removing to output a spatial noise included in an input video using a level of an inputted temporal noise, a video signal storing unit delaying to output the video signal outputted through the spatial filtering unit, a temporal noise estimation unit clipping to output a difference between two temporally consecutive video signals respectively outputted through the spatial filtering unit and the video signal storing unit at a same position into a prescribed threshold if the difference between the two temporally consecutive video signals is greater than the prescribed threshold, a noise correction unit correcting the noise estimated by the temporal noise level estimation unit to output to the spatial filtering unit, and a noise removal unit removing the noise included in the video signal in a temporal area using a level of the corrected noise.

In another aspect of the present invention, an apparatus for removing a noise of a video signal includes a spatial noise level estimation unit estimating to output a level of a spatial noise from an inputted video signal, a spatial filtering unit removing to output the spatial noise included in an input video using a level of the spatial noise outputted from the spatial noise level estimation unit, a video signal storing unit delaying to output the video signal outputted through the spatial filtering unit, a temporal noise estimation unit clipping a difference between two temporally consecutive video signals respectively outputted through the spatial filtering unit and the video signal storing unit at a same position into a prescribed threshold if the difference between the two temporally consecutive video signals is greater than the prescribed threshold, the temporal noise estimation unit estimating to output a level of a temporal noise, and a temporal filtering unit removing the noise included in the video signal using the levels of the noises estimated by the temporal and spatial noise level estimation units, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention describes level estimation and removal of a video signal through various embodiments as follows.

First Embodiment

Figure 1:
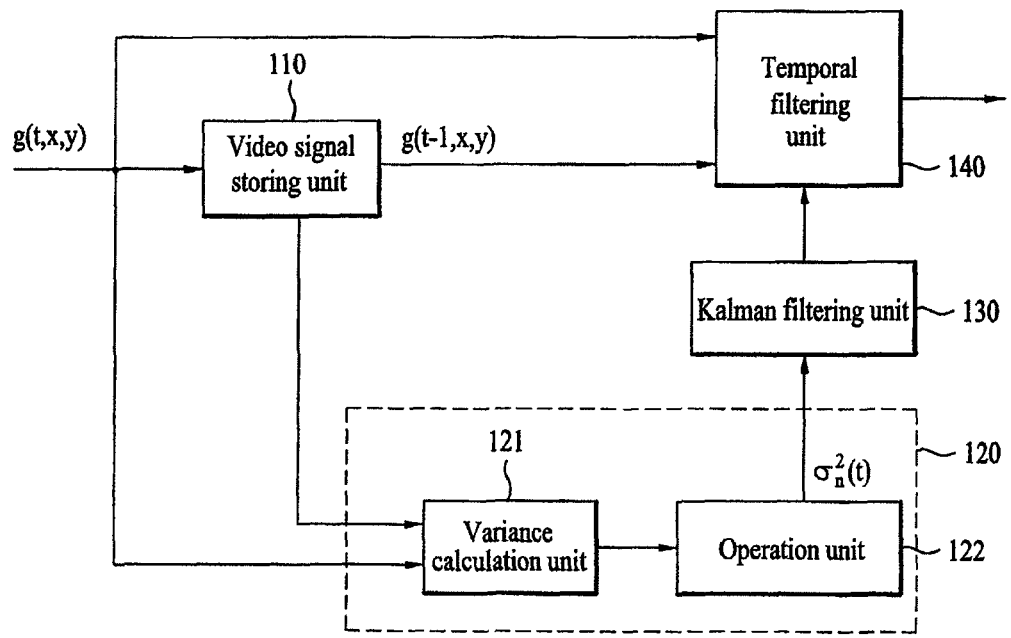
FIG. 1 is a block diagram of an apparatus for removing a noise of a video signal according to a first embodiment of the present invention.

FIG. 1 is a block diagram of an apparatus for removing a noise of a video signal according to a first embodiment of the present invention.

Referring to FIG. 1, an apparatus for removing a noise of a video signal according to a first embodiment of the present invention includes a video signal delay unit 110, a temporal noise level estimation unit 120, a Kalman filtering unit 130 and a temporal filtering unit 140.

In the above-configured apparatus, a current input video is provided to the video signal storing unit 110, the temporal noise level estimation unit 120 and the temporal filtering unit 140.

The video signal storing unit 110 delays the input video by a frame unit and then outputs the delayed signal to the temporal noise level estimation unit 120 and the temporal filtering unit 140.

The temporal noise level estimation unit 120 includes an operation unit 121 finding an absolute value of a frame difference between brightness values of two temporally consecutive videos and a variance computation unit 122 outputting a variance $\sigma_t^2(t)$ of a temporal noise by computing a variance corresponding to the absolute value.

The operation unit 121 receives the currently inputted video and the 1-frame delayed video from video signal storing unit 110 and outputs the absolute value of the frame difference between the brightness values of the two temporally consecutive videos to the variance computation unit 122. The variance computation unit 122 computes a variance for the absolute value to output as an estimated value $\sigma_t^2(t)$ of a level of a temporal noise contained in the video signal. The level of the temporal noise estimated by the temporal noise level estimation unit 120 is then inputted to the Kalman filtering unit 130.

The Kalman filtering unit (data association and Kalman filtering unit) 130 performs temporal correction on the inputted noise estimated value $\sigma_t^2(t)$. Since the level of the noise is not an actual noise but an estimated noise, the estimation may be wrong. Hence, the temporal correction is performed.

For this, the Kalman filtering unit 130 puts two state values for the estimated noise $\sigma_t^2(t)$ to perform data association with the estimated level of the noise, and performs 1-dimensional Kalman filtering. The Kalman filtering unit 130 then outputs the filtered state value, which is smaller in temporal variance, as a final estimated noise.

This process is explained in detail as follows.

Firs of all, two state values $x_1(t)$ and $x_2(t)$ are taken into consideration. The state values are random (probability) variables having normalized distributions $(m_k(t), \sigma_t^2(t))$, k=1 and $(m_k(t), \sigma_t^2(t))$, k=2, respectively.

In this case, if t=0, an initial value of each of the state values is established by Formula 2.

$$m_1(0)=361, \sigma_1^2(0))=361^2$$

$$m_2(0)=0, \sigma_2^2(0))=361^2 \quad \text{[Formula 2]}$$

In Formula 2, '361' is an initial value established on the assumption that a maximum value of a standard deviation is '19'. This value can be set differently according to a maximum level of noise.

Hence, the Kalman filtering unit 130 selects a state value having a closer distance each time the noise $\sigma_t^2(t)$ estimated by the temporal noise level estimation unit 120 is inputted. In particular, the Kalman filtering unit 130 selects a state value $x_1(t-1)$ if the variance $\sigma_t^2(t))$ of the inputted noise meets Formula 3. Otherwise, the Kalman filtering unit 130 selects another state value $x_2(t-1)$.

$$\frac{|\sigma_n(t) - m_1(t-1)|}{\sigma_1(t-1)} < \frac{|\sigma_n(t) - m_2(t-1)|}{\sigma_2(t-1)} \quad \text{[Formula 3]}$$

In case that the state value $x_1(t-1)$ is selected, it is updated by Formula 4.

$$\sigma_{dist}^2(t) = \{\sigma_n(t) - m_1(t-1)\}^2 \quad \text{[Formula 4]}$$

$$\alpha_1 = \frac{\sigma_1^2(t-1)}{\sigma_1^2(t-1) + \sigma_1^{dist}(t)}$$

$$m_1(t) = \alpha_1 \cdot \sigma_1(t) + (1-\alpha_1) \cdot m_1(t-1)$$

$$\sigma_1^2(t) = (1-\alpha_1) \cdot \sigma_1^2(t-1)$$

As the unselected state value $x_2(t-1)$ increases in uncertainty, a current value of an average is sustained but a variance is increased instead like Formula 5.

$$m_2(t)=m_2(t-1)$$

$$\sigma_1^2(t)=(1+\alpha_1)\cdot\sigma_2^2(t-1) \quad \text{[Formula 5]}$$

In this case, if the $\sigma_t^2(t)$ fails in meeting Formula 3, Formula 4 is applied to an update of the state value $x_2(t-1)$ and Formula 5 is applied to sustain the current state value $x_1(t-1)$ and to increase the variance instead.

Finally, an average of the state value having the smaller variance is outputted as an estimated noise at the corresponding timing point.

In particular, if Formula 6 is met, '$m_1(t)$' becomes the estimated noise at a timing point t. Otherwise, '$m_2(t)$' becomes the estimated noise at a timing point t.

$$\sigma_1(t)<\sigma_2(t) \quad \text{[Formula 6]}$$

Figure 2:
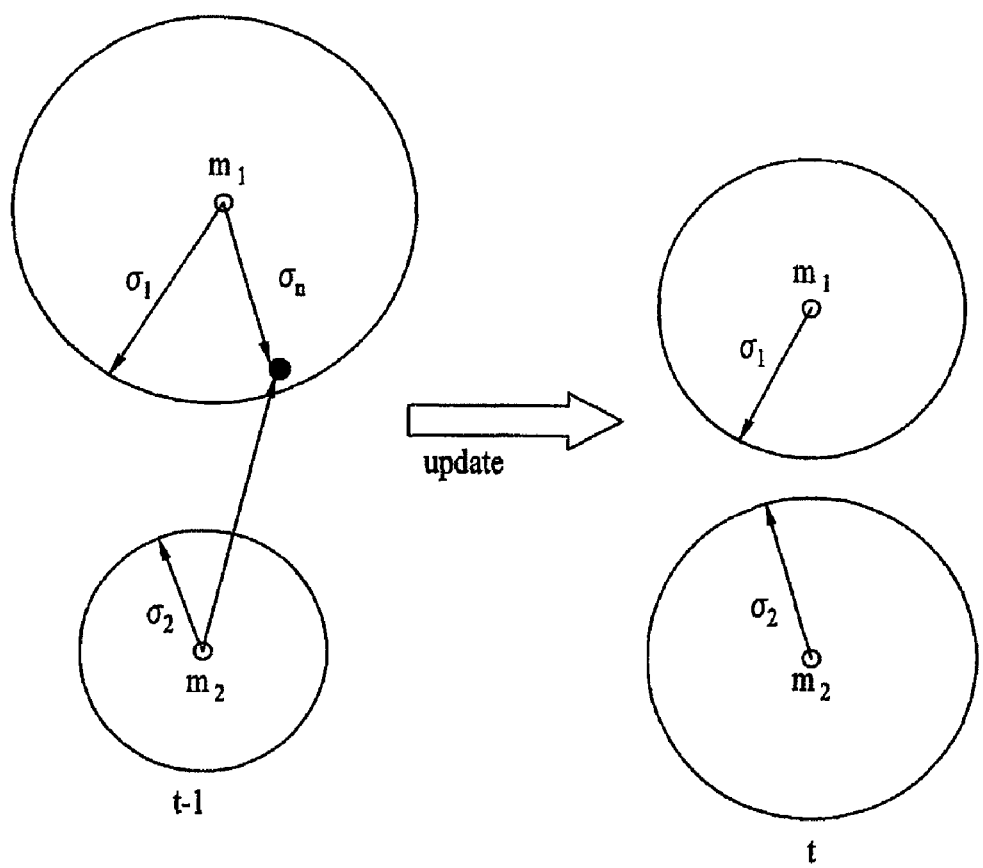
FIG. 2 is a diagram for explaining a concept of temporal filtering in an apparatus for removing a noise of a video signal according to the present invention.

FIG. 2 is a diagram for explaining a concept of temporal filtering in an apparatus for removing a noise of a video signal according to the present invention.

Referring to FIG. 2, two state values $x_1(t-1)$ and $x_2(t-1)$ have averages $m_1(t-1)$ and $m_2(t-1)$ and variances $\sigma_1(t-1)$ and $\sigma_2(t-1)$ at a timing point (t-1), respectively.

Once $\sigma_t^2(t)$ is inputted through temporal noise level estimation, a state value having a closer distance from $\sigma_t^2(t)$ is selected from the two state values according to the distance reference shown in Formula 3.

In the embodiment shown in FIG. 2, the state value $x_1(t-1)$ is closer to $\sigma_t^2(t)$ than the other state value $x_2(t-1)$. Hence, $x_1(t-1)$ is updated by Formula 4 and $x_2(t-1)$ is updated by Formula 5.

Namely, an average position of $x_1(t-1)$ is updated and a variance meaning uncertainty is reduced. On the other hand, an average value of $x_2(t-1)$ is sustained but a variance is increased due to the increment of uncertainty.

A level of the noise corrected by the Kalman filtering unit 130 is provided to the temporal filtering unit 140. The temporal filtering unit 140 receives 1-frame delayed video signal from the video signal storing unit 110 and the level of the corrected noise from the Kalman filtering unit 130, removes the noise contained in the corresponding video signal, and then outputs the noise-removed signal.

According to one embodiment of the present invention, the temporal filtering unit 140 includes a 2-tap IIR (infinite impulse response) filter receiving two temporally consecutive video signals.

In this case, each of the video signals is a signal applied to a pixel included in a frame or field.

A result outputted from the temporal filtering unit 140 can adopt a concept of linear minimum means square error (LMMSE). Hence, a result from the filtering of the temporal filtering unit 140 can be determined by a total of weights for pixels of a current video signal by Formula 7 and a previous video signal temporally consecutive to the current video signal.

$$g_0(t, x, y) = \quad \text{[Formula 7]}$$

$$\frac{1+w(t,x,y)}{2}g(t,x,y) + \frac{1-w(t,x,y)}{2}g(t-1,x,y)$$

Figure 7:
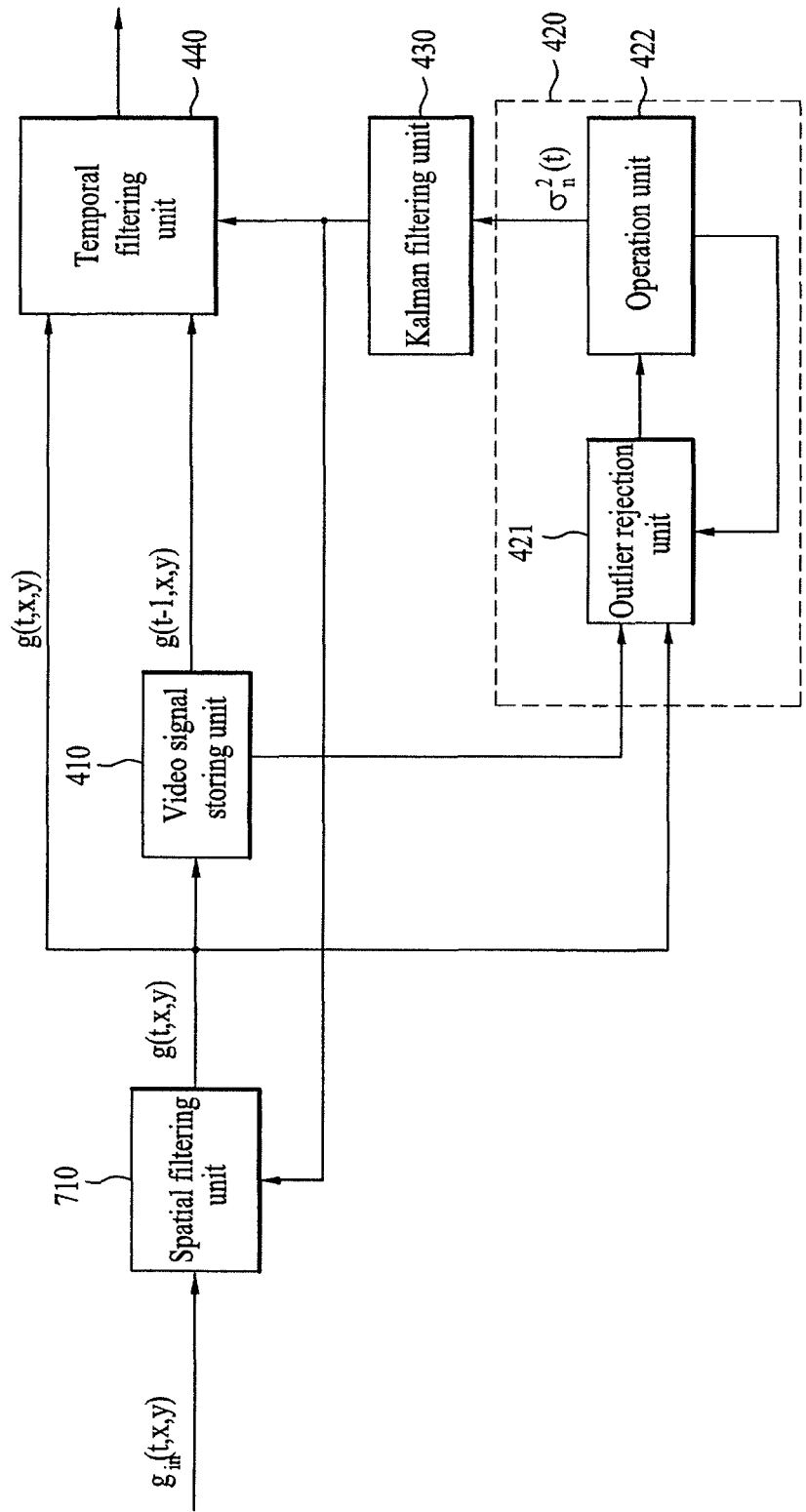
FIG. 7 is a block diagram of an apparatus for removing a noise of a video signal according to a fourth embodiment of the present invention.

In FIG. 7, 't' indicates a time and 'x' or 'y' indicates a position of pixel. 'w(t,x,y)' indicates a weight depending on a relation between a noise variance $\sigma_n^2$ and a video signal variance $\sigma_p^2$. And, the relation can be represented as Formula 8.

$$w(t, x, y) = \frac{\sigma_p^2(t, x, y)}{\sigma_p^2(t, x, y) + 2\sigma_n^2} \quad \text{[Formula 8]}$$

Figure 8:
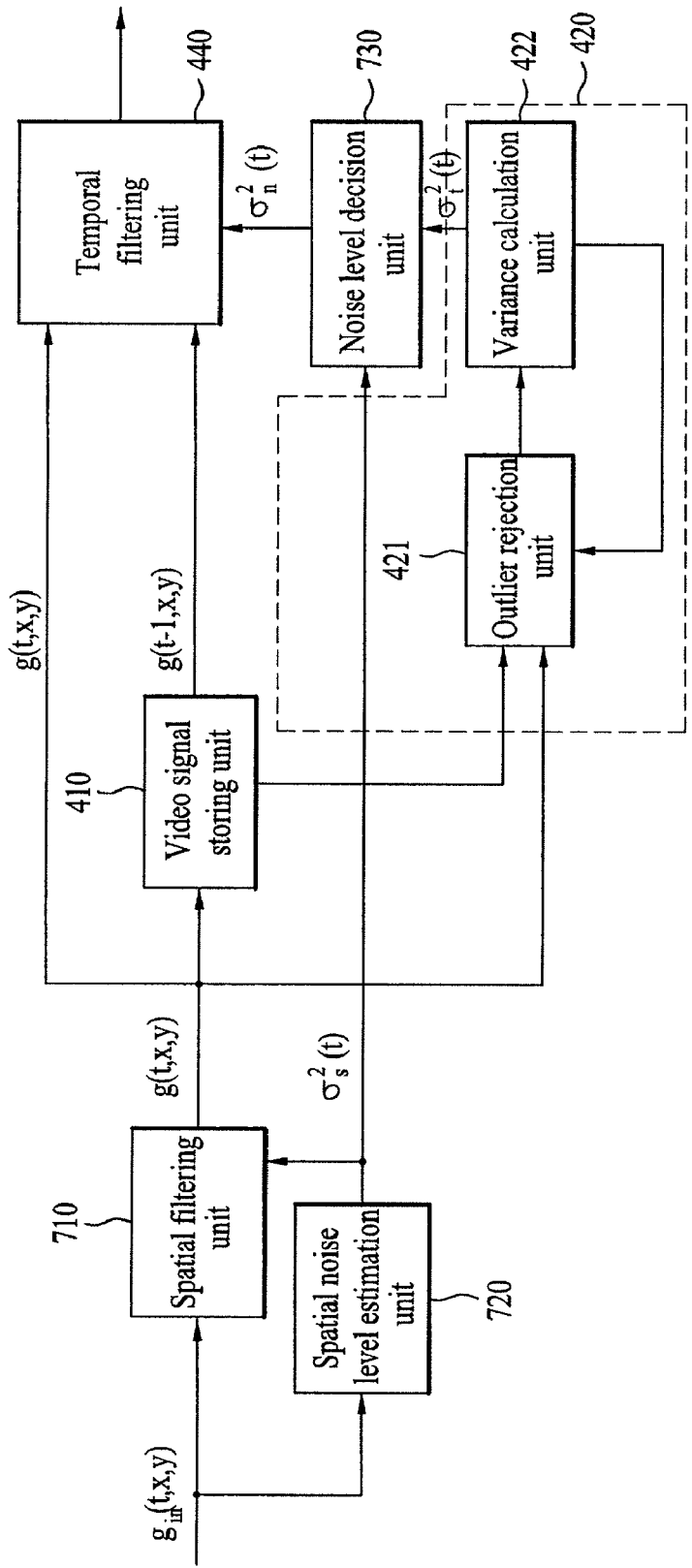
FIG. 8 is a block diagram of an apparatus for removing a noise of a video signal according to a fifth embodiment of the present invention.

In FIG. 8, the video signal variance $\sigma_p^2$ is expressed as Formula 9.

$$\sigma_p^2(t,x,y)=\max(0,\sigma_g^2(t,x,y)-2\sigma_n^2(t)) \quad \text{[Formula 9]}$$

In Formula 9, $\sigma_g^2$ is a local variance calculated by putting a window having a prescribed size over a difference between two temporally consecutive video signals.

An example of calculating the $\sigma_g^2$ is explained with reference to FIG. 3 as follows.

Figure 3:
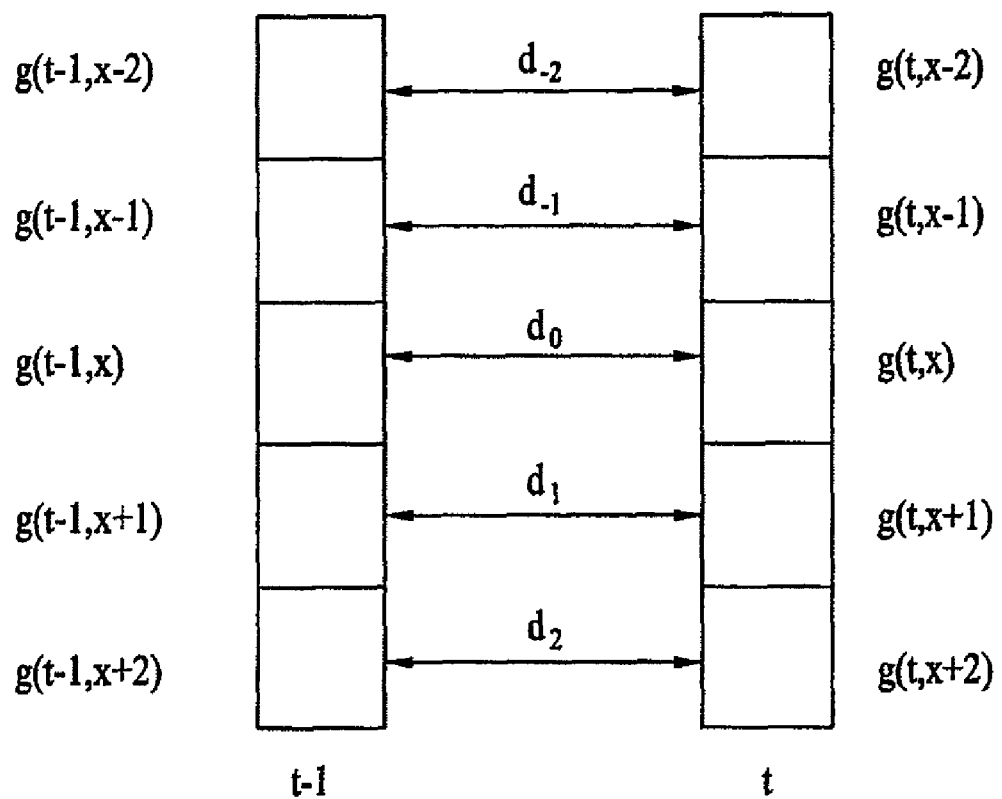
FIG. 3 is a diagram for explaining a process of computing a local variance for a time difference according to the present invention and an example of a window.

FIG. 3 is a diagram for explaining a process of computing a local variance for a time difference according to the present invention and an example of a window.

Referring to FIG. 3, to find $\sigma_g^2$ for a video signal g(t, x), a 1×5 window is used for example. A size of the window can be differently determined.

First of all, a video signal difference $d_k$ according to a time difference between timing points t and (t−1) for a pixel at a same position is sought. Subsequently, a variance of $d_k$ can be found by subtracting a square of the $d_k$ average from a total of a square of the $d_k$ for an interval of the window. In particular, the variance within the 1×5 window for the $d_k$ of each pixel is found to become the variance $\sigma_g^2$.

As can be seen from Formula 8, a variance of a video signal at the same timing point has a different value at a position of each pixel so as to be represented as $\sigma_p^2(t,x,y)$. Yet, a variance of a noise has a same value $\sigma_n^2$ within a field or frame at a same timing point.

In order to calculate a weight from Formula 8 and Formula 9, a level of noise should be preferentially calculated. As a temporal filtering result is determined by the noise level, stability of the noise level estimating method should be secured to provide reliability to the temporal filtering result.

Second Embodiment

Figure 4:
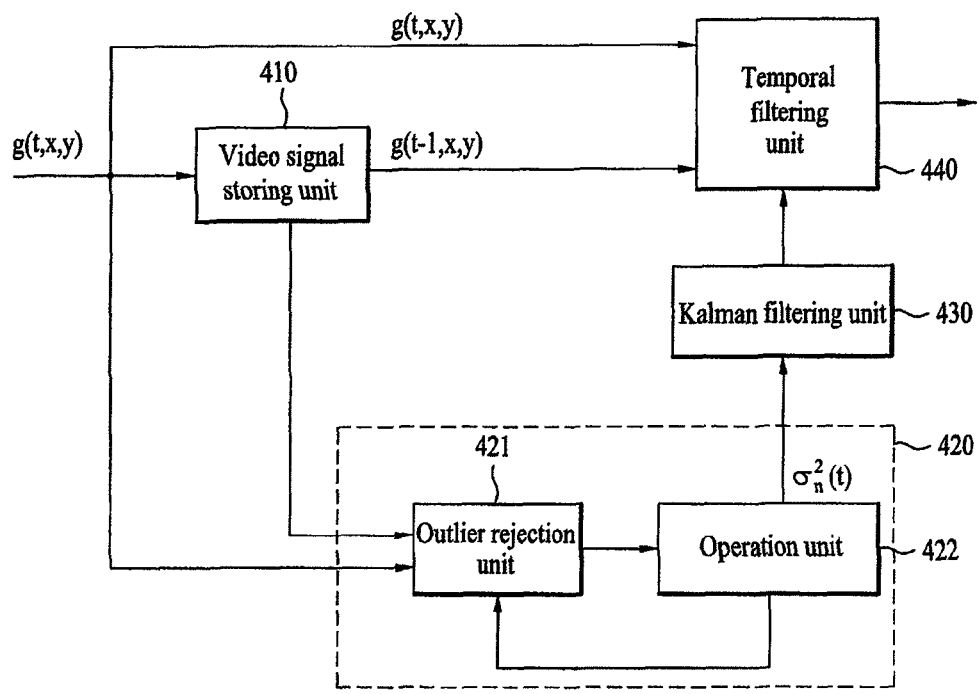
FIG. 4 is a block diagram of an apparatus for removing a noise of a video signal according to a second embodiment of the present invention.

FIG. 4 is a block diagram of an apparatus for removing a noise of a video signal according to a second embodiment of the present invention.

Referring to FIG. 4, an apparatus for removing a noise of a video signal according to a second embodiment of the present invention includes a video signal storing unit 410, a temporal noise level estimation unit 420, a Kalman filtering unit 430 and a temporal filtering unit 440.

The second embodiment of the present invention differs from the first embodiment of the present invention in an estimation process of the temporal noise level estimation unit 420.

The temporal noise level estimation unit 420 receives a difference between two temporally consecutive video signals, calculates a variance of a noise, from which a noise component exceeding a specific level is removed, among noises generated from a video motion between two timing points, and then outputs the calculated variance.

Namely, a video signal, i.e., a currently inputted video signal (hereinafter called a measured signal) measured at a timing point t can be expressed as Formula 10, in which a noise component n(t) is added to an original video signal f(t, x, y).

$$g(t,x,y) = f(t,x,y) + n(t) \quad \text{[Formula 10]}$$

It is assumed that the noise signal has a normalized distribution, in which average is '0' and in which a variance is $\sigma_n^2$. And, it is also assumed that the noise signal has a wide-sense stationary characteristic. Moreover, it is assumed that the noise signal is un-correlated with a video signal.

If an original video is moved away by (dx, dy) at a timing point (t+1), a measured video signal can be represented as Formula 11.

$$g(t+1,x,y) = f(t+1,x-dx(x,y), y-dy(x,y)) + n(t+1) \quad \text{[Formula 11]}$$

A difference d(t, x, y) between timing points t and (t+1), as shown in Formula 12, includes a video signal difference and a noise signal difference.

$$\begin{aligned} d(t, x, y) &= g(t+1, x, y) - g(t, x, y) \quad \text{[Formula 12]} \\ &= f(t+1, x-dx(x, y), y-dy(x, y)) - \\ &\quad f(t, x, y) + n(t+1) + n(t) \\ &= d_f(t, x, y) + d_n(t) \end{aligned}$$

An average for the difference d(t, x, y), as shown in Formula 13, can be represented as a video signal difference average and a noise signal difference average. An average $E_{(x,y)}(d_n(t))$ for the noise signal difference becomes 0 on the aforesaid assumptions.

$$\begin{aligned} E_{(x,y)}(d(t, x, y)) &= E_{(x,y)}(d_s(t, x, y)) + E_{(x,y)}(d_n(t)) \quad \text{[Formula 13]} \\ &= E_{(x,y)}(d_s(t, x, y)) \end{aligned}$$

A variance of the difference d(t, x, y) can be represented as Formula 14 or can be expressed as Formula 15 by calculation using Formula 12.

$$\text{Var}_{(x,y)}(d(t, x, y)) = E_{(x,y)}(d_s^2(t, x, y)) + E_{(x,y)}^2(d_s(t, x, y)) \quad \text{[Formula 14]}$$

$$\begin{aligned} \text{Var}_{(x,y)}(d(t, x, y)) &= \text{Var}_{(x,y)}(d_s(t, x, y)) + \text{Var}_{(x,y)}(d_n(t)) = \quad \text{[Formula 15]} \\ &\quad E_{(x,y)}(d_s^2(t, x, y)) - E_{(x,y)}^2(d_s(t, x, y)) + 2\sigma_n^2 \end{aligned}$$

Using the fact that a difference average of the measured signal is equal to a difference average of the video signal from Formula 13, Formula 14 and Formula 15 can be arranged into Formula 16.

$$\sigma_n^2 = \frac{E_{(x,y)}(d^2(t, x, y)) - E_{(x,y)}(d_f^2(t, x, y))}{2} \quad \text{[Formula 16]}$$

From Formula 16, a variance of noise amounts to a difference between an average of a squared difference of a measured signal and an average of a squared difference of an original video signal.

In this case, a first term of a right side of Formula 16 can be easily calculated but a second term is unknown. Hence, an approximate value can be obtained through a reliable assumption to compute a level of noise.

An operation of the temporal noise level estimation unit 420 according to the present invention is explained with reference to FIG. 4 as follows.

First of all, the temporal noise level estimation unit 420 can include an outlier rejection unit 421 and a variance calculation unit 422 to compute a noise.

The outlier rejection unit 421 rejects an outlier of the noise computed by the variance calculation unit 432 through Formula 17 to approximate a value of the second term of Formula 16 to zero.

$$d(t,x,y) = \min(\text{th}, g(t+1,x,y) - g(t,x,y)) \quad \text{[Formula 17]}$$

As shown in Formula 17, if a difference of video signals for two temporally consecutive pixels at the same position (x, y) is greater than a threshold (th), a value of the video signal is forcibly clipped into the threshold (th). In case that motion of two temporally consecutive videos is big, the difference of the video signal value does not deviate from a reference value. Hence, filtering can be adaptively performed on the motion.

An initial value of the threshold can be reset to a proper value, and a threshold after the initial value can be set to a value resulting from multiplying a noise calculated in a previous frame or field by a constant k like Formula 18.

$$th(t) = k \cdot \sigma_n(t-1) \quad \text{[Formula 18]}$$

The outlier means an abnormal value deviating from a statistical distribution in general. Assuming that a noise has a normalized distribution, the outlier rejection unit 421 can remove a value deviating from a normalized distribution in the noise, i.e., an outlier of a value generated from the motion of the two video signals for a time using Formula 17.

The variance calculation unit 422 computes an average of a square of a difference component of the noise from which the outlier is excluded. And, the computed value, as shown in Formula 19, becomes a value approximate to a variance of noise.

$$\sigma_d^2 = E_{(x,y)} d^2(t,x,y) \approx 2\sigma_n^2 \quad \text{[Formula 19]}$$

The noise level computed by the variance calculation unit 422 is inputted to the Kalman filtering unit 430.

Operations of the Kalman filtering unit 430 and the temporal filtering unit 440 are as good as those in the first embodiment of the present invention, of which explanation is skipped in the following description.

Third Embodiment

Figure 5:
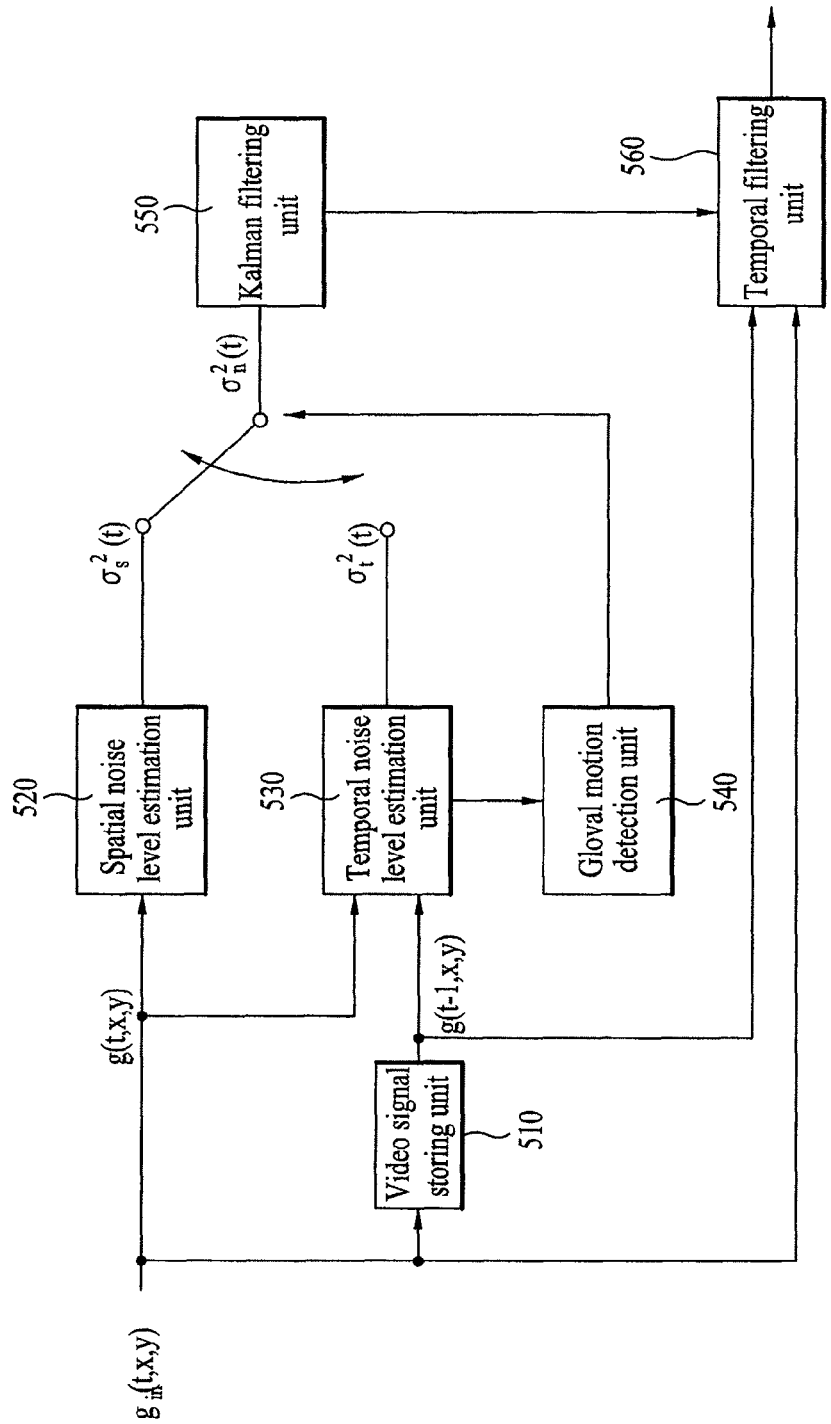
FIG. 5 is a block diagram of an apparatus for removing a noise of a video signal according to a third embodiment of the present invention.

FIG. 5 is a block diagram of an apparatus for removing a noise of a video signal according to a third embodiment of the present invention.

Referring to FIG. 5, an apparatus for removing a noise of a video signal according to a third embodiment of the present invention includes a video signal storing unit 510, a spatial noise level estimation unit 520, a temporal noise level estimation unit 530, a global motion detection unit 540, a Kalman filtering unit 550 and a temporal filtering unit 560.

A current input video is provided to the video signal storing unit 510, the spatial noise level estimation unit 520, the temporal noise level estimation unit 530 and the temporal filtering unit 560.

The video signal storing unit 510 delays an input video by a frame unit and them outputs the delayed signal to the spatial noise level estimation unit 520, the temporal noise level estimation unit 530 and the temporal filtering unit 560.

The temporal noise level estimation unit 520 estimates a level of a spatial noise contained in an inputted video signal using characteristics of noise and video signal distributions.

Figure 6:
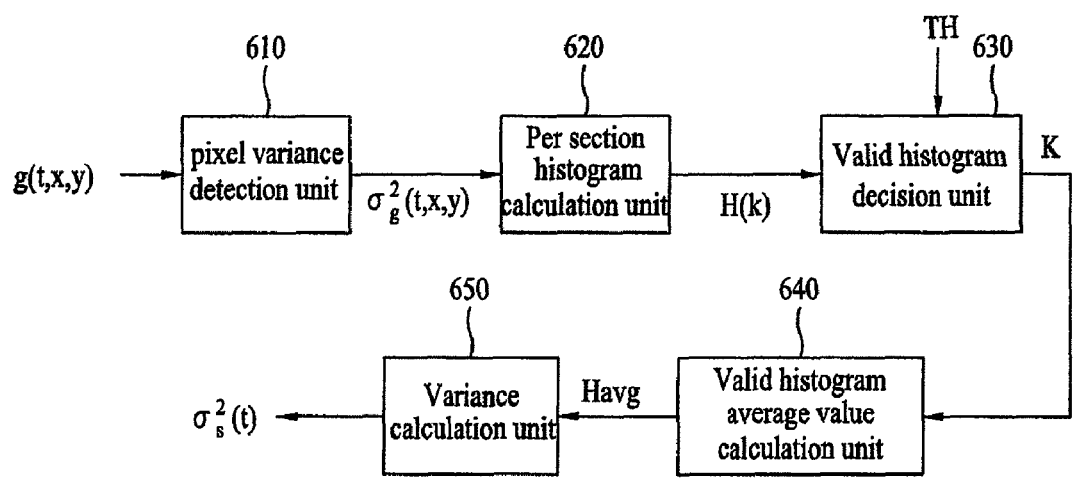
FIG. 6 is a detailed block diagram of a spatial noise level estimation unit shown in FIG. 5 according to one embodiment of the present invention.

FIG. 6 is a detailed block diagram of the spatial noise level estimation unit 520 according to one embodiment of the present invention.

Referring to FIG. 6, the spatial noise level estimation unit 520 includes a pixel variance detecting nit 610 calculating a local variance value $\sigma_g^2(t,x,y)$ for an input pixel, a per section histogram calculation unit 620 calculating a per section histogram for the variance value $\sigma_g^2(t,x,y)$ of each pixel, a valid histogram value decision unit 630 deciding the number K of histogram values to be used for a variance decision of noise, a valid histogram value calculation unit 640 finding an average of valid histogram values outputted from the valid histogram value decision unit 630, and a variance calculation unit 650 deciding a minimum variance among variances corresponding to histogram values exceeding the average value as a variance of noise.

Assuming that an input video signal having noise, i.e., an input pixel is set to g(t,x,y), '(t,x,y)' indicates a spatio-temporal position. And, 'g(t,x,y)' means an input pixel located at 'x' in a horizontal direction, at 'y' in a vertical direction, and at 't' in a direction of a temporal axis.

In this case, the pixel variance detection unit 610 calculates the local variance value $\sigma_g^2(t,x,y)$ for the input pixel according to Formula 20 and then outputs the calculated value to the per section histogram calculation unit 620.

$$\sigma_g^2(t, x, y) = E[(g - \mu_g)^2] \quad \text{[Formula 20]}$$
$$= E[g^2] - \mu_g^2$$
$$\cong \frac{1}{S} \sum_{(t,x,y) \in S} g^2(t, x, y) - \left( \frac{1}{S} \sum_{(t,x,y) \in S} g(t, x, y) \right)^2$$

In this case, an operator $E[\cdot]$ is an operator for finding an expectation and 'S' means a support region.

For instance, in case of finding a local variance using pixels within a 3×3 window, 'S' becomes a 3×3 window centering on a position of an input pixel.

The per section histogram calculation unit 620 calculates a per section histogram H(k) for a variance value $\sigma_g^2(t,x,y)$ of each pixel outputted from the pixel variance detection unit 610. IN particular, the per section histogram calculation unit 620 calculates a per section histogram H(k) for a local variance of pixels existing within one frame.

The per section histogram H(k) found by the per section histogram calculation unit 620 is inputted to the valid histogram value decision unit 630. The valid histogram value decision unit 630 then decides the number K of histogram values to be used for a variance decision of noise according to Formula 21.

$$K = {}^{max}_{k} \left\{ k \, \middle| \, \sum_{l=1}^{k} H(l) \le TH \right\} \quad \text{[Formula 21]}$$
$$= {}^{max}_{k} \{ k \, | \, H\_sum \le TH \}$$

A meaning of 'K' found by Formula 21 indicates the number of histograms included in the number of maximum values among accumulative values meeting a condition that a result from accumulating outputs of the per section histogram calculation unit 620 is smaller than the threshold 'TH'.

In this case, the threshold 'TH' is the number of pixels required for obtaining a reliable measurement result of noise and preferably amounts to 25% of total pixel number included in one screen according to a text result.

The valid histogram average value calculation unit 640 finds an average of valid histogram values corresponding to outputs of the valid histogram value decision unit 630 and then outputs the found value to the variance calculation unit 650.

The variance calculation unit 650 decides a minimum variance among variances corresponding to valid histogram values greater than a valid histogram average value $H_{avg}$ as a variance $\sigma_s^2(t)$ of the noise included in a current ($t^{th}$) frame.

Meanwhile, the temporal noise level estimation unit 120 finds a variance $\sigma_s^2(t)$ of temporal noise by the first or second embodiment of the present invention.

Formula 22 indicates an absolute value of a brightness difference (frame difference) between two temporally consecutive videos in case that there exists no global motion. In this case, the difference between the two videos follows a normalized distribution and its variance corresponds to a level of the corresponding noise.

$$d(x,y)=|g_t(x,y)-g_{t-1}(x,y)| \quad \text{[Formula 22]}$$

On the other hand, if there exists a motion, a difference of brightness values after motion compensation follows a distribution of noise according to Formula 23.

$$d(x,y)=|g_t(x,y)-g_{t-1}(x+dx,y+dy)| \quad \text{[Formula 23]}$$

Yet, the motion estimation and compensation need a considerable amount of operations and their cost for hardware implementation is considerably high.

So, the global motion detection unit 540 decides an existence or non-existence of a global motion between two consecutive videos by receiving an output of the temporal noise level estimation unit 530. If there exists a global motion, a variance of a spatial noise estimated by the spatial noise level estimation unit 520 is selected. If there exists no global motion, a variance of a temporal noise estimated by the temporal noise level estimation unit 530 is selected to be outputted to the Kalman filtering unit 550.

For instance, the global motion detection unit 540 decides whether there is a camera motion between two consecutive videos by receiving the output of the temporal noise level estimation unit 530 or a current video and a video stored in the video signal storing unit 510. In particular, an average $m_d$ and variance $\sigma_d$ for a difference of brightness values of two temporally consecutive videos are calculated and the calculated values are then compared to predetermined thresholds $m_{th}$ and $\sigma_{th}$, respectively.

If Formula 24 is met, it is decided that there is no camera motion and a noise variance estimated by the temporal noise level estimation unit 530 is then selected. If Formula 24 is not met, it is decided that the camera motion is big and a noise variance estimated by the spatial noise level estimation unit 520 is selected to be outputted to the Kalman filtering unit 550.

$$m_d<m_{th}, \sigma_d<\sigma_{th} \quad \text{[Formula 24]}$$

Thus, the global motion detection unit 540 motion-adaptively selects the spatially estimated noise level or the temporally estimated noise level and then outputs the selected level to the Kalman filtering unit 550.

Operations of the Kalman filtering unit 550 and the temporal filtering unit 560 are as good as those in the first embodiment of the present invention, of which explanation is skipped in the following description.

Fourth Embodiment

FIG. 7 is a block diagram of an apparatus for removing a noise of a video signal according to a fourth embodiment of the present invention.

Referring to FIG. 7, a spatial filtering unit 710 can be connected in a cascade form to the temporal filtering unit 440 shown in FIG. 4 that adaptively performing filtering according to a motion of a video.

Namely, a part for performing temporal filtering adaptively according to a motion of a video can have the configuration of the embodiment shown in FIG. 4. Alternatively, the part can have the configuration of the embodiment shown in FIG. 1.

Yet, the fourth embodiment of the present invention sown in FIG. 7 can further include the spatial filtering unit 710 that removes a noise spatially distributed in a video signal prior to performing the temporal filtering.

In order for the spatial filtering unit 710 to remove a noise, an adaptive mean filter, a median filter, an adaptive median filter and the like can be used.

In case of using a filter of the adaptive filter series, a noise distribution should be known since the adaptive filter series adaptively decides whether to perform the noise filtering according to a noise. In the fourth embodiment of the present invention shown in FIG. 7, a level of the temporal noise, which is estimated by the temporal noise level estimation unit 420 and is corrected by the Kalman filtering unit 430, is used for spatial filtering. Alternatively, a level of the temporal noise, which is estimated by the temporal noise level estimation unit 120 in FIG. 1 and is corrected by the Kalman filtering unit 130 in FIG. 1, can be used for the spatial filtering.

A signal through the spatial filtering unit 710 removes a noise signal from a measured signal of a video by carrying out the adaptive temporal filtering of the video explained in FIG. 4.

Yet, if a result from estimating a temporally generated noise is applied to a removal of a spatially generated noise, it may be unsuitable for the noise removal due to the different characteristics in-between. On the other hand, if a result from estimating a spatially generated noise is applied to a removal of a temporally generated noise, it may be unsuitable for the noise removal as well. Hence, it is preferable that a separate means for calculating and applying a spatial noise is appended to the spatial filtering unit 710.

Fifth Embodiment

FIG. 8 is a block diagram of an apparatus for removing a noise of a video signal according to a fifth embodiment of the present invention.

Referring to FIG. 8, a spatial noise level estimation unit 720 separately estimating a spatial noise is further included in the configuration of the fourth embodiment of the present invention shown in FIG. 7.

A variance of the spatial noise estimated by the spatial noise level estimation unit 720 is inputted to the spatial filtering unit 710 so that a spatial filtering work of a noise can be performed.

Figure 9:
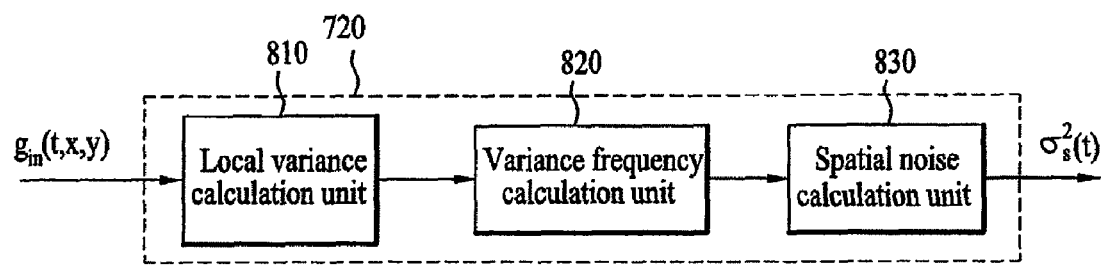
FIG. 9 is a detailed block diagram of a spatial noise level estimation unit shown in FIG. 8 according to one embodiment of the present invention.

FIG. 9 is a detailed block diagram of a spatial noise level estimation unit shown in FIG. 8 according to one embodiment of the present invention.

Referring to FIG. 9, the spatial noise level estimation unit 720 shown in FIG. 8 according to one embodiment of the present invention includes a local variance calculation unit 810, a variance frequency calculation unit 820 and a spatial noise calculation unit 830.

The local variance calculation unit 810 puts a window of a predetermined size (e.g., 3×3) on each pixel of a frame or field inputted at a same timing point to compute a spatial noise. The local variance calculation unit 810 then obtains a variance value for all pixels by calculating a local variance for a video signal of a pixel within the window.

The variance frequency calculation unit 820 divides the calculated local variance value into predetermined-size sections and then calculates a frequency that a variance value included in each of the sections shows up.

If a spatial variation of the video signal is considerable, a variation of a variance value of a video signal for a pixel included in one frame or field is considerable. Otherwise, the variation of the variance value will not be considerable.

Hence, it can be decided that some variance values, each of which is equal to or greater than a predetermined level, among the local variance values are generated from variations of an original video signal. Yet, some of variance values, each of which is smaller than the predetermined level, among the local variance values can indicate that a noise is included in the video signal.

The spatial noise calculation unit 830 finds a reference frequency for a frequency calculated by the variance frequency calculation unit 820 and calculate one of variance values corresponding to a frequency section having the reference frequency included therein as a variance value of a spatial noise.

The spatial noise calculation unit 830 calculates the spatial noise in a following manner for example. First of all, the reference frequency can be an average frequency of the calculated frequencies. A smallest one of variance values corresponding to the frequency section having the average frequency included therein can be calculated as a variance value of a spatial noise.

The signal, on which the spatial filtering for the noise has been carried out by the spatial filtering unit 710, is inputted to the video signal storing unit 410 to undergo motion adaptive temporal filtering.

A subsequent noise removing operation is as good as that of the explained embodiment in FIG. 4. Yet, the embodiment shown in FIG. 8 can further include a noise level decision unit 730.

The noise level decision unit 730 decides a noise variance used for a noise removal by the temporal filtering unit 440 using variances of temporal and spatial noises calculated by the temporal and spatial noise level estimation units 420 and 720, respectively. In particular, the noise level decision unit 730 fuses a variance of a spatial noise outputted from the spatial noise level estimation unit 720 and a variance of a temporal noise outputted from the spatial noise level estimation unit 420 together and then applies a variance $\sigma_n^2(t)$ of a final noise to the temporal filtering unit 440.

A method of deciding the final noise $\sigma_n^2(t)$ by the noise level decision unit 730 is explained with reference to Formula 25 as follows.

$$\text{if } \sigma_t \geq \sigma_s, \text{ then } \sigma_n = \max(0, \sigma_t - (\sigma_t - \sigma_s))$$

$$\text{if } \sigma_t < \sigma_s, \text{ then } \sigma_n = \sigma_s \quad \text{[Formula 25]}$$

If a variance $\sigma_t$ of a spatial noise outputted from the temporal noise level estimation unit 420 is equal to or greater than a variance $\sigma_s$ of a spatial noise outputted from the spatial noise level estimation unit 720, it can be decided that an inter-video motion is big. Hence, to execute less temporal filtering, a variance $\sigma_n$ of a final noise can be decided by reducing the variance of the spatial noise outputted from the spatial noise level estimation unit 420. For instance, the variance of the temporal noise is reduced by a difference between the variance of the temporal noise and the variance of the spatial noise in Formula 25.

If a variance $\sigma_t$ of a spatial noise outputted from the temporal noise level estimation unit 420 is smaller than a variance $\sigma_s$ of a spatial noise outputted from the spatial noise level estimation unit 720, a variance $\sigma_n$ of a final noise can be set to the variance $\sigma_s$ of the spatial noise.

Namely, if the temporal noise is greater than the spatial noise with reference to the spatial noise, it means a case that the inter-video motion is big. Hence, the temporal noise is reduced to execute less filtering. Otherwise, it means a case that the inter-video motion is small. Hence, the spatial noise is applied to the spatial filtering.

And, a Kalman filtering unit can be further provided to at least one of an output end of the temporal noise level estimation unit 420, an output end of the spatial noise level estimation unit 720 and an output end of the noise level decision unit 730 to correct an estimated noise.

Accordingly, the present invention provides the following effects or advantages.

First of all, a level of noise is directly estimated from a video. Hence, the present invention is applicable to all systems requesting a reduction of noise in a moving picture.

Secondly, the present invention can be more effectively applied to the noise reduction for the image quality enhancement of a TV video signal.

Thirdly a video can be prevented from being blurred in the noise removing process of temporal or spatio-temporal filtering.

Fourthly, by performing adaptive filtering on a video motion, afterimage can be prevented from occurring in the noise filtering process in case that the motion is big.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for removing a noise of a video signal, comprising:
    a spatial noise level estimation unit estimating a level of a spatial noise included in the video signal using a characteristic of a distribution of the noise and a distribution of the video signal;
    a temporal noise level estimation unit estimating a level of a temporal noise included in the video signal using a frame difference between two temporally consecutive videos;
    a global motion detection unit selecting to output one of the levels of the noises estimated by the spatial and temporal noise level estimation units, respectively according to a motion degree between the two temporally consecutive videos;
    a spatial filtering unit removing to output a spatial noise included in an input video using a level of an inputted temporal noise;
    a temporal filtering unit removing the noise included in the video signal using the levels of the noises estimated by the temporal and spatial noise level estimation units, respectively;
    a noise removal unit removing the noise included in the video signal using the corrected level of the noise; and
    a video signal storing unit delaying to output the video signal outputted through the spatial filtering unit.

2. The apparatus of claim 1, further comprising a temporal noise estimation unit clipping a difference between two temporally consecutive video signals respectively outputted through the spatial filtering unit and the video signal storing unit at a same position into a prescribed threshold if the difference between the two temporally consecutive video signals is greater than the prescribed threshold, the temporal noise estimation unit estimating to output a level of a temporal noise.

3. The apparatus of claim 1, further comprising a Kalman filtering unit provided to at least one selected from the group consisting of output ends of the spatial noise level estimation unit, the temporal noise level estimation unit and the noise level decision unit to correct the level of the estimated noise.

* * * * *